(12) United States Patent
Maurer

(10) Patent No.: US 6,915,024 B1
(45) Date of Patent: Jul. 5, 2005

(54) IMAGE SHARPENING BY VARIABLE CONTRAST MAPPING

(75) Inventor: Ron P. Maurer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 587 days.

(21) Appl. No.: 09/676,011

(22) Filed: Sep. 29, 2000

(51) Int. Cl.[7] .............................................. G06K 9/40
(52) U.S. Cl. ...................... 382/274; 382/251; 382/252; 382/253; 382/274
(58) Field of Search ............................... 382/251–253, 382/274

(56) References Cited

U.S. PATENT DOCUMENTS

| | | | | |
|---|---|---|---|---|
| 5,042,077 A | * | 8/1991 | Burke | 382/169 |
| 5,289,549 A | * | 2/1994 | Rattey et al. | 382/238 |
| 5,361,308 A | * | 11/1994 | Lee et al. | 382/204 |
| 5,524,070 A | * | 6/1996 | Shin et al. | 382/274 |
| 5,774,601 A | * | 6/1998 | Mahmoodi | 382/298 |
| 5,900,732 A | * | 5/1999 | Felmlee et al. | 324/309 |
| 5,966,134 A | * | 10/1999 | Arias | 345/589 |
| 5,970,164 A | * | 10/1999 | Bamberger et al. | 382/128 |
| 5,982,926 A | * | 11/1999 | Kuo et al. | 382/167 |
| 6,097,853 A | * | 8/2000 | Gu et al. | 382/282 |
| 6,298,085 B1 | * | 10/2001 | Kondo et al. | 375/240 |
| 2003/0020800 A1 | * | 1/2003 | Sani et al. | 348/447 |

FOREIGN PATENT DOCUMENTS

| | | |
|---|---|---|
| EP | 0377386 A2 | 7/1990 |
| EP | 1093295 A2 | 4/2001 |
| EP | 1130545 A2 | 9/2001 |

OTHER PUBLICATIONS

Fahnestock et al. "Spatially Variant Contrast Enhancement Using Local Range Modification", Optical Engineering, 22, 378–381.*

Zimmerman et al. "An Evaluation of the Effectiveness of Adaptive Histogram Equalization for Contrast Enhancement" Dec. 1988. IEEE Transactions on Medical Imaging, vol. 7 No. 4. pp. 304–312.*

* cited by examiner

*Primary Examiner*—Andrew W. Johns
*Assistant Examiner*—Patrick L Edwards

(57) ABSTRACT

Image sharpening is performed by applying variable contrast stretching to pixels of interest in a digital image. For each pixel of interest, the amount of contrast stretching is a function of minimum and maximum intensity values in a local pixel neighborhood.

17 Claims, 3 Drawing Sheets

IMAGE SHARPENING BY VARIABLE CONTRAST MAPPING

BACKGROUND OF THE INVENTION

The present invention relates to digital images. More specifically, the present invention relates to image sharpening.

Image sharpening is performed to improve the appearance of digital images and particularly the legibility of documents. One well-known image sharpening technique is unsharp masking.

However, traditional unsharp masking enhances perceptible noise in sharpened images. For instance, the unsharp masking enhances low-amplitude noise in scanned images and captured photographs. In addition, traditional unsharp masking does not avoid overshoot at edges. Overshoot can be especially troublesome if a digital image is interpolated. The overshoot is spatially spread by the interpolation and appears as an artifact in the interpolated image.

Modifications to traditional unsharp masking have been made to reduce the perceptible noise and avoid the overshoot. However, the modifications do not address imperceptible noise, which reduces the compressibility of the sharpened images. Moreover, modified unsharp masking techniques that avoid overshoot are usually slower to perform.

Another image sharpening technique, known from morphological filtering theory, is toggle mapping. Toggle mapping is usually effective for sharpening text-based images containing edges between black text and white background. However, toggle mapping is not as effective for sharpening image regions that are not purely black and white. In such regions, the toggle mapping tends to oversharpen textures and natural (e.g., photographed) features. The toggle mapping also tends to enhance noise, although not as much as traditional unsharp masking. Moreover, the toggle mapping tends to produce jagged edges in text in low-resolution images (in low resolution images, the text looks better when smoothed by anti-aliasing).

SUMMARY OF THE INVENTION

According to one aspect of the present invention, a digital image is sharpened by clipping those pixel intensity values outside of a variable range; and mapping those pixel intensity values within the variable range. This technique improves image quality without enhancing low-amplitude noise in an image, and it avoids overshoot.

Other aspects and advantages of the present invention will become apparent from the following detailed description, taken in conjunction with the accompanying drawings, illustrating by way of example the principles of the present invention.

DETAILED DESCRIPTION OF THE INVENTION

Figure 1:
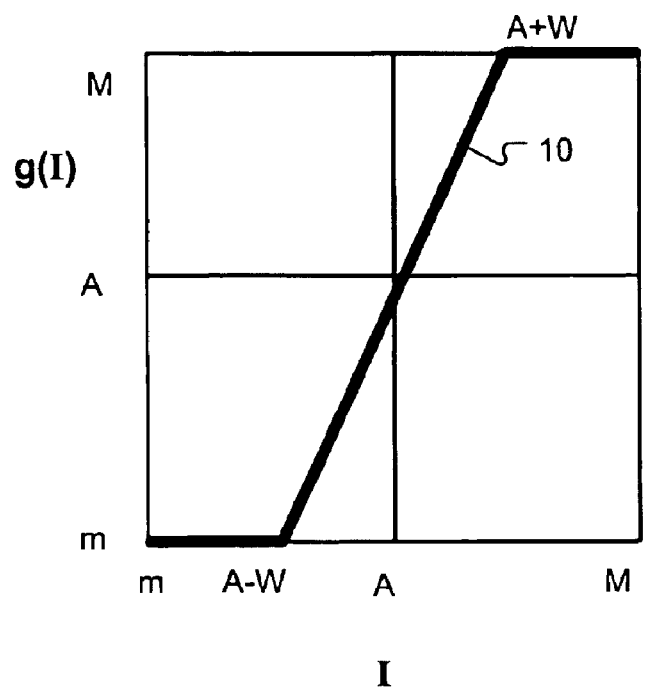
FIG. 1 is an illustration of variable contrast stretching.

As shown in the drawings for purposes of illustration, the present invention is embodied in a method and apparatus for sharpening an image by variable contrast stretching. The variable contrast stretching reduces spatial scale of large gray-level transitions, resulting in a considerable sharpening in features that are computer-generated (e.g., text, CAD drawings). The variable contrast stretching only mildly reduces the spatial scale of milder gray-level transitions, resulting in a milder sharpening of features that are "natural" (e.g., photographed features). Thus, the variable contrast stretching applies strong sharpening to computer-generated features and mild sharpening to edges in natural features. The variable contrast stretching improves the appearance and legibility of compound documents containing both natural and computer-generated features. However, the spatial scale for weak gray-level transitions is essentially unchanged.

The variable contrast stretching avoids overshoot. Thus, overshoot-related artifacts do not appear as the result of interpolation of digital images that have been sharpened by variable contrast stretching.

The variable contrast stretching does not enhance low-amplitude noise. In fact, it can slightly reduce low-amplitude noise. Because the variable contrast stretching does not increase low-amplitude noise and it avoids overshoot, compressibility of the sharpened image is not reduced relative to the original image. Consequently, a digital image may be sharpened only once, prior to compression, thus avoiding the need to sharpen the image each time after decompression.

The variable contrast stretching can work in raster-scan mode with an upper bound on the number of operations per scan line. This makes it suitable for real-time operations.

Reference is made to FIG. 1, which illustrates variable contrast stretching for a digital image. The digital image is made up of a plurality of pixels, each pixel being represented by an intensity value. A point-wise contrast stretching operation g(I) is performed on each pixel of interest as follows.

$$g(I) = \begin{cases} I - A \leq -W & m \\ |I - A| < W & A + \frac{D}{2W}(I - A) \\ I - A \geq W & M \end{cases}$$

The pixel of interest is modified with respect to a neighborhood of pixels. The gray-value or intensity of the pixel of interest is denoted by the letter I. Maximum gray-value of the neighborhood is denoted by the uppercase letter M, and minimum gray-value of the neighborhood is denoted by the lowercase letter m. The local dynamic range of the neighborhood, denoted by the letter D, is the difference between minimum and maximum values of the neighborhood (that is, D=M−m).

A "contrast range" has a width of 2 W. The contrast range is centered about the middle (A) of the dynamic range. A=(M+m)/2. Thus, the contrast range has a starting point at A−W and an ending point at A+W.

If the intensity value of the pixel of interest is outside of the contrast range, the intensity value is clipped to either m or M. If the intensity value of the pixel of interest lies within the contrast range, the amount by which the local contrast is changed is determined by the gradient of the slope of a line segment 10 within the contrast range.

The slope of the line segment 10 is a function of the dynamic range. The slope, denoted by S(QD), is related to the contrast range and the dynamic range as follows:

$$S(D) = \frac{D}{2W}.$$

In general, the slope complies with the following: the slope approaches unity as the dynamic range approaches 0 (i.e., $S(D) \rightarrow 1$ as $D \rightarrow 0$); the slope is greater than unity when the dynamic range is greater than zero (i.e., $S(D) > 1$ when $D \neq 0$), and the slope is a non-decreasing function of the dynamic range. As the dynamic range increases, the slope becomes larger and the sharpening increases.

Thus the slope is a function of the dynamic range and the contrast range of a given pixel neighborhood. Because a neighborhood is determined for each pixel, the dynamic range, the contrast range and the slope are variable on a pixel-by-pixel basis.

There are many different ways of expressing the slope of the line segment 10. For example, the slope may be expressed as follows.

$$S(D) = \frac{D}{2W} = 1 + \frac{D}{R}$$

where constant R is a single global parameter that controls corresponds to the dynamic scale for sharpening. This also defines the contrast width (2 W) as a function of the dynamic range (D):

$$W = \frac{1}{2}(R^{-1} + D^{-1})^{-1}.$$

Thus the variable contrast stretching operation within the variable contrast range may be expressed as follows.

$$g(I) = I + \frac{D}{R}(I - A) \ \{|I - A| < W\}$$

If $D \gg R$, the mapping becomes equivalent to toggle mapping, whereby edges are oversharpened. Proper selection of the constant R prevents such a problem. For neighborhoods having small dynamic ranges, $D \ll R$ and $1+D/R \approx 1$. Therefore, no effective change in contrast will occur for $D \ll R$.

The constant R may be limited to powers of two for computational efficiency. Since the quantity $1+D/R$ involves a division by the constant R, limiting the constant R to a power of two allows the division to be performed simply by bit-shifting. Thus $R=2^L$, where integer $L>0$. As the constant R decreases, the sharpening effect increases since the contrast region is smaller and the slope of the contrast stretching becomes larger.

For pixel intensity values that are represented by 8-bit words, the preferred value of R is between 64 and 512. That is, $6 \leq L \leq 9$. More generally, if the dynamic range of the entire image is normalized to cover the complete dynamic range of the capturing device (e.g., scanner), the preferred value of R is between one-quarter of the dynamic range and twice the dynamic range.

Figure 2:
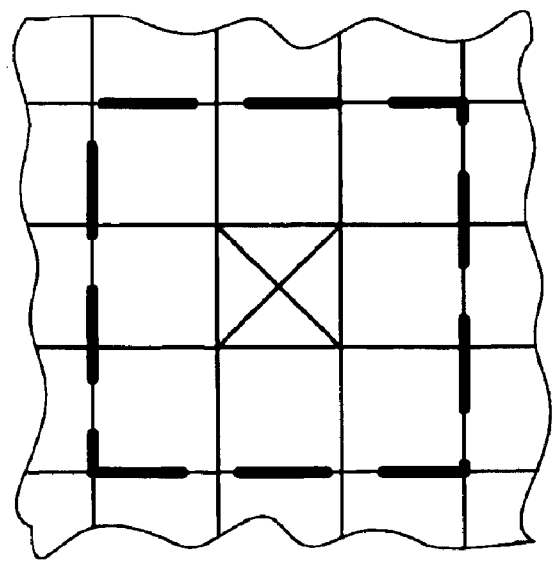
FIG. 2 is an illustration of a neighborhood of pixels for the variable contrast stretching.
Figure 3:
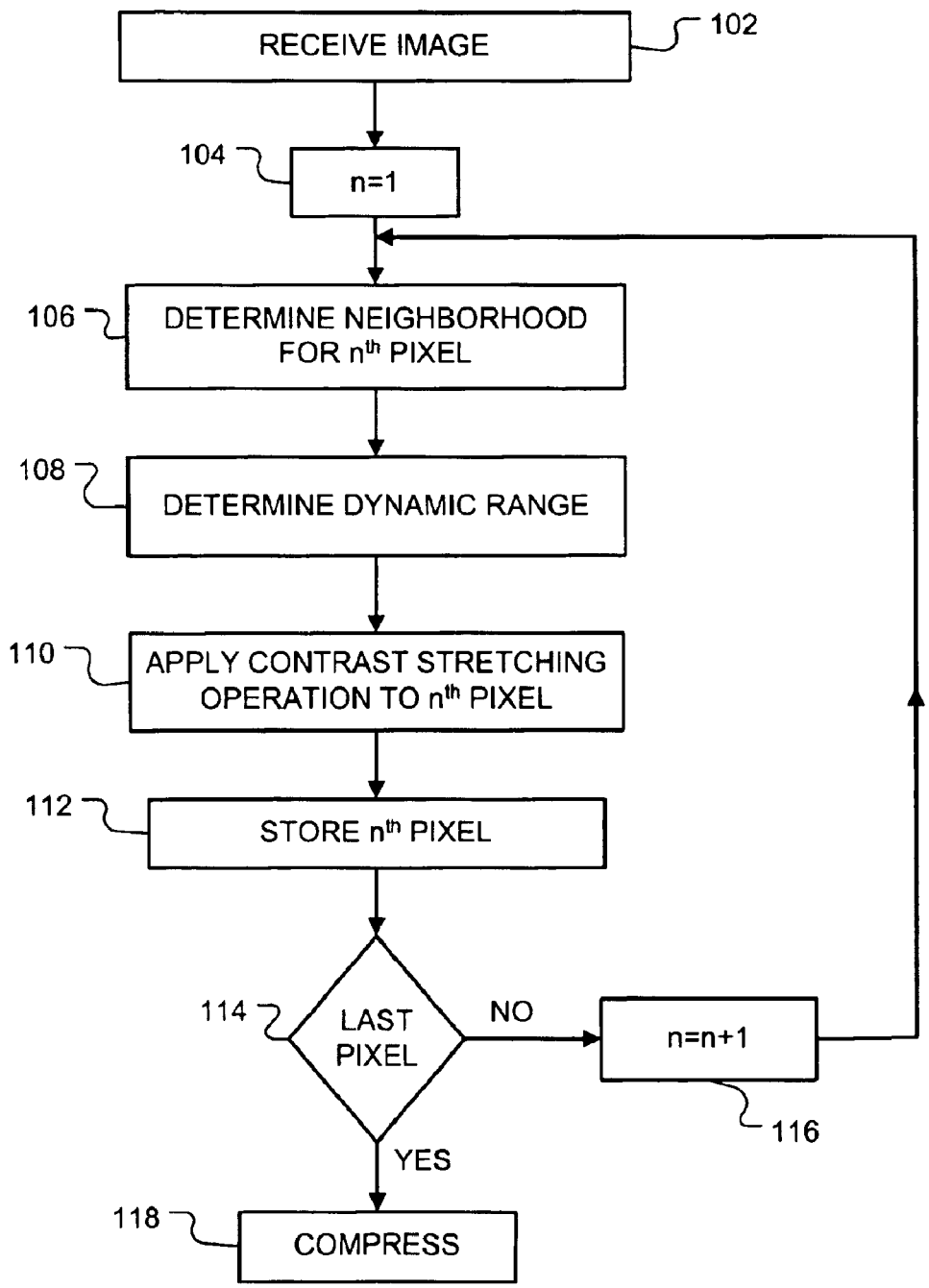
FIG. 3 is an illustration of a method of sharpening a digital image by variable contrast stretching.

Reference is now made to FIG. 2, which illustrates an example of a neighborhood of pixels. The neighborhood, delineated by a window indicated in dashed lines, includes a 3×3 array of pixels. The pixel of interest, marked by an "X," lies at the center of the neighborhood. Thus, the function g(I) is applied to the center pixel (marked by the "X") and the dynamic range is determined by the minimum and maximum intensity values of the pixels lying within the window. If, for example, the pixel intensity values are represented by 8-bit words, the lowest intensity value of the pixels in the neighborhood is m=5 and the highest intensity value of the pixels in the neighborhood is M=250, the dynamic range is D=245 for that neighborhood. Reference is now made to FIG. 3, which shows a general method of applying the sharpening filter to a digital image. A digital image is accessed (block 102). The digital image may be accessed from a digital image file, the digital image may be received one or more lines at a time and processed in real time, etc.

For each pixel of interest in the digital image (blocks 104, 114, 116), a neighborhood of pixels is determined (block 106), a dynamic range and contrast range of the neighborhood are determined (block 108), and the contrast stretching operation g(I) is applied to the pixel of interest (block 110). Each filtered pixel is stored in a new file (block 112). Pixels lying at the boundaries of the digital image will have partial neighborhoods. These boundary pixels may be processed with respect to their partial neighborhoods, or the filtering may be ignored and the boundary pixels may be stored without modification.

Not all neighborhoods will have the same dynamic range (unless all pixels in the image have the same pixel intensity value). Thus the dynamic range is variable. The contrast region, slope and mapping are all variable too.

After the sharpening filter has been applied to the digital image, the sharpened image may be compressed and stored (block 118). Because the variable contrast stretching does not enhance noise and can even reduce low-amplitude noise, the variable contrast stretching does not reduce compressibility of the sharpened image.

The compressed image may be accessed and decompressed at a later time. Since the compressed image is already sharpened, sharpening does not have to be performed on the decompressed image. Thus, sharpening on the image is performed only once; it is not performed each time the image is decompressed.

Figure 4:
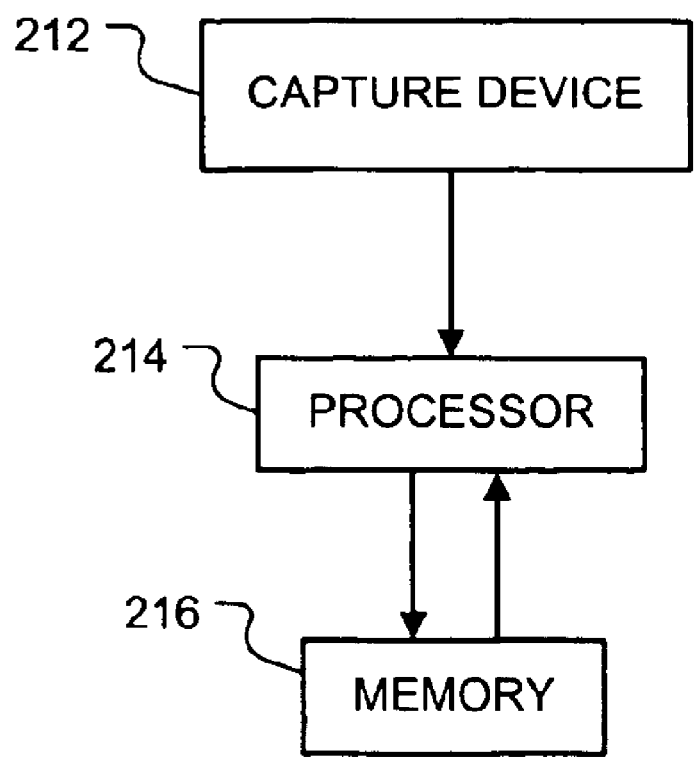
FIG. 4 is an illustration of a hardware implementation of variable contrast stretching.

Reference is now made to FIG. 4. The variable contrast stretching may be implemented in hardware, software or a combination of the two. In general, an image capture device 212 provides lines of a digital image to a processor 214. The processor 214 may store all of the lines of the digital image in memory 216 for sharpening at a later time, or it may sharpen the digital image in real time. The sharpened image may also be stored in the memory 216. When sharpening the digital image, the processor 214 performs the filtering steps described in FIG. 3.

The amount of image blurring in the capture device 212 determines how much sharpening is needed. The constant R may be set by subjective quality tests. Different values for the constant R may be tested, and the value producing the most desirable image may be used.

In a software implementation of the variable contrast stretching, the memory 216 stores a program that, when executed, instructs the processor 214 to perform the filtering steps described in FIG. 3. The processor 214 and memory 216 may be part of a personal computer or workstation, they may be embedded in an image capture device, etc.

A non-recursive algorithm may be used to determine the minimum and maximum values of pixel neighborhoods. The non-recursive algorithm may be used for all types of neighborhoods. The size of the memory needed to determine the minimum and maximum values is equal to the size of the neighborhood.

A fast recursive algorithm may be used to determine the minimum and maximum values of full square neighborhoods (e.g., 3×3 neighborhoods, 5×5 neighborhoods). Only twelve comparisons are needed to determine the maximum and minimum values, regardless of window size. If this recursive algorithm is used, the size of memory needed to buffer the lines is twice the size of the lateral kernel window.

The variable contrast stretching can be performed in real time in raster-scan mode because there is a relatively small upper bound on the number of operations per scan line. Recursive and non-recursive algorithms may be used for real time operation. Although FIG. 2 shows a 3×3 square-shaped neighborhood, the variable contrast stretching is not limited to such a neighborhood. The neighborhood is not limited to any particular size. The number of pixels is not limited to nine. Although a fixed number of pixels in the neighborhood is preferred for all pixels of interest, the size of the neighborhood may be changed dynamically to accommodate a particular class of image region (e.g., text, graphics, natural features).

The neighborhood is not limited to any particular geometry, although square windows are preferred for performance reasons. For example, the shape of the neighborhood may be diamond-shaped. The minimum/maximum calculations may include the center pixel (that is, a full neighborhood may be used) or the minimum/maximum calculations may exclude the center pixel of interest (that is, a hollow neighborhood may be used). A hollow neighborhood might be preferred for images containing speckle-type noise.

The variable contrast stretching may be "bootstrapped" onto another filtering method that determines minimum and maximum pixel intensity values for neighborhoods of pixels. This would allow the variable contrast stretching to be performed at virtually no additional overhead, since the main computational effort goes to computing the minimum and maximum values. For example, the variable contrast stretching may be bootstrapped onto a "despeckling" method that determines minimum and maximum pixel intensity values for neighborhoods in which the center pixel (the pixel of interest) has been excluded. The despeckling method is performed to clean speckle noise composed of isolated light pixels on a dark background and vice-versa. Thus both despeckling and variable contrast stretching may be performed, with virtually no additional overhead for performing the variable contrast stretching.

The variable contrast stretching is not limited to linear mapping within the contrast range. Although linear mapping is preferred, non-linear mapping within the contrast range may be performed.

Variable contrast stretching is not limited to documents including both text and natural images. It may be applied to images of any type, including images containing only text and images containing only natural features. If the variable contrast stretching is applied to images that are entirely computer-generated (which images contain no low-amplitude noise), artifacts at sharp edges will not be produced.

Although the variable contrast stretching has been described in connection with grayscale values, it is not so limited. The variable contrast stretching may be performed on multiple color planes. For example, the variable contrast stretching may be performed on images in RGB color space as follows. The color image is transformed into YCbCr color space. Sharpening is applied only to the luminance channel (Y) and the sharpened result is combined with unsharpened chrominance information, and the sharpened image is transformed from YCbCr color space back to RGB color space. Consequently, color fringes at the edges are not enhanced. These artifacts might occur if all three color planes are sharpened separately.

The variable contrast stretching works well with a simple approximation for transforming the pixels from RGB color space to YCbCr color space and back to RGB color space. For example, the following transformations may be used.

$$\begin{cases} Y = \frac{1}{4}(R + 2G + B) \\ C_1 = R - G \\ C_2 = B - G \end{cases} \Rightarrow \begin{cases} G = Y - \frac{1}{4}(C_1 + C_2) \\ R = G + C_1 \\ B = G + C_2 \end{cases}$$

These transformations are fast to compute, since all multiplications and divisions are performed by bit-shifting. Because the luminance channel is changed during sharpening, the transformation back to RGB color space might result in a color component that is outside of its allowable range. Such a component may be clipped to its maximum or minimum allowable value (e.g., 0 or 255 for an 8-bit word).

The present invention is not limited to the specific embodiments described and illustrated above. Instead, the invention is construed according to the claims that follow.

What is claimed is:

1. A method of processing pixel intensity values of a plurality of pixels in a digital image, the method comprising:

clipping those pixel intensity values outside of a variable range, the variable range for each of the pixels being a function of dynamic range of a local pixel neighborhood; and mapping those pixel intensity values within the variable range as follows:

$$g(I) = \begin{cases} I - A \le -W & m \\ |I - A| < W & A + \frac{D}{2W}(I - A) \\ I - A \ge W & M \end{cases}$$

where m represents the minimum value of the neighborhood, M represents the maximum value of the neighborhood, D represent the dynamic range, D/(2 W) represents the slope, I represents pixel intensity value, g(I) represents the mapping operation, A represents the middle of a dynamic range, and 2 W represents width of a contrast range, the contrast range being centered about the middle of the dynamic range, the contrast range being a function of the dynamic range.

2. The method of claim 1, wherein D/(2 W)=1+D/R, where R corresponds to dynamic scale for sharpening, whereby $$g(I) = I + \frac{D}{R}(I - A) \text{ for } \{|I - A| < W\}.$$

3. The method of claim 2, wherein R has a value that is constant for all pixels in the image.

4. The method of claim 2, wherein a capturing device is used to provide the digital image; and wherein R is between one-quarter and twice a range that is normalized to cover the complete dynamic range of the capturing device.

5. A method of sharpening a digital image, the digital image including a plurality of pixels of interest, for each pixel of interest the method comprising:

determining a dynamic range of a pixel neighborhood, where the dynamic range of a pixel neighborhood is based on a difference of minimum and maximum pixel values in the pixel neighborhood; and performing contrast stretching on the pixel if the pixel lies within a contrast range, the contrast range a function of the dynamic range, the contrast stretching operation performed on each pixel of interest as follows:

$$g(I) = \begin{cases} I - A \leq -W & m \\ |I - A| < W & A + \frac{D}{2W}(I - A) \\ I - A \geq W & M \end{cases}$$

where m represents the minimum value of the neighborhood, M represents the maximum value of the neighborhood, D represent the dynamic range, D/(2 W) represents the slope, I represents pixel intensity value, g(I) represents the contrast stretching operation, A represents the middle of the dynamic range, and 2 W represents width of the contrast range, the contrast range being centered about the middle of the dynamic range, the contrast range being a function of the dynamic range.

6. The method of claim 5, wherein D/(2 W)=1+D/R, where R corresponds to dynamic scale for sharpening, whereby $$g(I) = I + \frac{D}{R}(I - A) \text{ for } \{|I - A| < W\}.$$

7. The method of claim 6, wherein a capturing device is used to provide the digital image; and wherein the value of R is between one-quarter and twice a range that is normalized to cover the complete dynamic range of the capturing device.

8. A method of sharpening a digital image, the digital image including a plurality of pixels of interest, for each pixel of interest the method comprising performing the following contrast stretching operation on each pixel of interest as follows:

$$g(I) = \begin{cases} I - A \leq -W & m \\ |I - A| < W & A + \frac{D}{2W}(I - A) \\ I - A \geq W & M \end{cases}$$

where m represents the minimum value of the neighborhood, M represents the maximum value of the neighborhood, D represent the dynamic range, D/(2 W) represents the slope, I represents pixel intensity value, g(I) represents the contrast stretching operation, A represents the middle of the dynamic range, and 2 W represents width of the contrast range, the contrast range being centered about the middle of the dynamic range, the contrast range being a function of the dynamic range.

9. Apparatus for processing pixels of interest in a digital image, the apparatus comprising a processor for determining dynamic ranges of pixel neighborhoods for the pixels of interest, and performing contrast stretching on each pixel of interest within the dynamic range of the corresponding pixel neighborhood, the contrast stretching performed on each pixel of interest as follows:

$$g(I) = \begin{cases} I - A \leq -W & m \\ |I - A| < W & A + \frac{D}{2W}(I - A) \\ I - A \geq W & M \end{cases}$$

where m represents the minimum value of the neighborhood, M represents the maximum value of the neighborhood, D represent the dynamic range, D/(2 W) represents the slope, I represents pixel intensity value, g(I) represents the contrast stretching operation, A represents the middle of the dynamic range, and 2 W represents width of a contrast range, the contrast range being centered about the middle of the dynamic range, the contrast range being a function of the dynamic range.

10. The apparatus of claim 9, wherein D/(2 W)=1+D/R, where R corresponds to dynamic scale for sharpening, whereby $$g(I) = I + \frac{D}{R}(I - A) \text{ for } \{|I - A| < W\}.$$

11. The apparatus of claim 10, wherein an image capture device is used to provide the digital image; and wherein the value of R is between one-quarter and twice a range that is normalized to cover the complete dynamic range of the capturing device.

12. Apparatus for sharpening a digital image, the apparatus comprising a processor for determining a contrast range for pixels of interest in the digital image, clipping intensity value of each pixel of interest if the intensity value lies outside of a contrast range or mapping the pixel intensity value if the pixel intensity value lies within the contrast range; the clipping and mapping performed according to $$g(I) = \begin{cases} I - A \leq -W & m \\ |I - A| < W & A + \frac{D}{2W}(I - A) \\ I - A \geq W & M \end{cases}$$

where m represents the minimum value of the neighborhood, M represents the maximum value of the neighborhood, D represent a dynamic range, D/(2 W) represents the slope, I represents pixel intensity value, A represents the middle of the dynamic range, and 2 W represents width of the contrast range, the contrast range being centered about the middle of the dynamic range, the contrast range being a function of the dynamic range.

13. The apparatus of claim 12, wherein D/(2 W)=1+D/R, where R corresponds to dynamic scale for sharpening, whereby $$g(I) = I + \frac{D}{R}(I - A) \text{ for } \{|I - A| < W\}.$$

14. The apparatus of claim 13, wherein an image capture device is used to provide the digital image; and wherein R is between one-quarter and twice a range that is normalized to cover the complete dynamic range of the capturing device.

15. An article for a processor, the article comprising memory and an image sharpening program stored in the memory, the program, when executed, causing the processor to process pixels of interest, each pixel of interest being processed by clipping its intensity value if its intensity value lies outside of a variable contrast range, and mapping its intensity value if its intensity value lies within the variable contrast range, wherein the dipping or mapping includes performing the following on each pixel of interest:

$$g(I) = \begin{cases} I - A \leq -W & m \\ |I - A| < W & A + \dfrac{D}{2W}(I - A) \\ I - A \geq W & M \end{cases}$$

where m represents the minimum value of a local neighborhood of pixel intensity values, M represents the maximum value of the neighborhood, D represents a dynamic range, D/(2 W) represents the slope, I represents pixel intensity value, A represents the middle of the dynamic range, and 2 W represents width of a contrast range, the contrast range being centered about the middle of the dynamic range, the contrast range being a function of the dynamic range.

16. The article of claim 15, wherein D/(2 W)=1+D/R, where R corresponds to dynamic scale for sharpening, whereby $$g(I) = I + \frac{D}{R}(I - A) \text{ for } \{|I - A| < W\}.$$

17. The article of claim 16, wherein R has a value that is constant for all pixels in the image.

* * * * *